(12) United States Patent
Jalal et al.

(10) Patent No.: US 9,990,292 B2
(45) Date of Patent: Jun. 5, 2018

(54) PROGRESSIVE FINE TO COARSE GRAIN SNOOP FILTER

(71) Applicant: ARM Limited, Cambridge (GB)

(72) Inventors: Jamshed Jalal, Austin, TX (US); Mark David Werkheiser, Austin, TX (US)

(73) Assignee: ARM Limited, Cambridge (GB)

( * ) Notice: Subject to any disclaimer, the term of this patent is extended or adjusted under 35 U.S.C. 154(b) by 18 days.

(21) Appl. No.: 15/196,266

(22) Filed: Jun. 29, 2016

(65) Prior Publication Data

US 2018/0004663 A1    Jan. 4, 2018

(51) Int. Cl.
| | |
|---|---|
| *G06F 12/00* | (2006.01) |
| *G06F 13/00* | (2006.01) |
| *G06F 13/28* | (2006.01) |
| *G06F 12/0831* | (2016.01) |
| *G06F 12/0811* | (2016.01) |
| *G06F 12/084* | (2016.01) |
| *G06F 12/0842* | (2016.01) |

(52) U.S. Cl.
CPC ........ *G06F 12/0831* (2013.01); *G06F 12/084* (2013.01); *G06F 12/0811* (2013.01); *G06F 12/0842* (2013.01); *G06F 2212/1032* (2013.01); *G06F 2212/6042* (2013.01)

(58) Field of Classification Search
CPC ....................... G06F 9/46–9/548; G06F 12/00; G06F 12/02; G06F 12/08–12/0808; G06F 12/0811; G06F 12/0813–12/0831; G06F 12/0833–12/0837; G06F 12/084; G06F 12/0842–12/128; G06F 2212/00–2212/7211
See application file for complete search history.

(56) References Cited

U.S. PATENT DOCUMENTS

| | | | |
|---|---|---|---|
| 5,966,729 A | * | 10/1999 | Phelps .................. G06F 9/5016 711/124 |
| 6,128,707 A | | 10/2000 | Arimilli et al. |
| 6,298,424 B1 | | 10/2001 | Lewchuk et al. |
| 6,519,685 B1 | | 2/2003 | Chang |
| 6,546,447 B1 | | 4/2003 | Buckland et al. |
| 6,598,123 B1 | | 7/2003 | Anderson |

(Continued)

OTHER PUBLICATIONS

Scalability port: a coherent interface for shared memory multiprocessors; Azimi et al; 10th Symposium on High Performance Interconnects; Aug. 21-23, 2002 (6 pages) (Year: 2002).*

(Continued)

*Primary Examiner* — Daniel C Chappell
(74) *Attorney, Agent, or Firm* — Leveque IP Law, P.C.

(57) ABSTRACT

A data processing system includes a snoop filter organized as a number of lines, each storing an address tag associated with the address of data stored in one or more caches of the system, a coherency state of the data, and presence data. A snoop controller sends snoop messages in response to data access requests. The presence data is configurable in a first format, in which the value of a bit in the presence data is indicative of a subset of the nodes for which at least one node in the subset has a copy of the data in its local cache, and in a second format, in which the presence data comprises a unique identifier of a node having a copy of the data in its local cache. The snoop controller sends snoop messages to the nodes indicated by the presence data.

15 Claims, 7 Drawing Sheets

(56) References Cited

U.S. PATENT DOCUMENTS

| | | | |
|---|---|---|---|
| 6,799,252 B1 | 9/2004 | Bauman | |
| 6,810,467 B1* | 10/2004 | Khare | G06F 12/0822 711/140 |
| 6,868,481 B1 | 3/2005 | Gaither | |
| 7,117,311 B1 | 10/2006 | Rankin | |
| 7,117,312 B1* | 10/2006 | Cypher | G06F 12/0831 711/146 |
| 7,240,165 B2 | 7/2007 | Tierney | |
| 7,325,102 B1* | 1/2008 | Cypher | G06F 12/0831 711/146 |
| 7,613,882 B1 | 11/2009 | Akkawi | |
| 7,685,409 B2 | 3/2010 | Du | |
| 7,698,509 B1* | 4/2010 | Koster | G06F 12/0813 711/119 |
| 7,836,144 B2 | 11/2010 | Mannava | |
| 7,925,840 B2* | 4/2011 | Harris | G06F 12/0831 711/146 |
| 7,937,535 B2 | 5/2011 | Ozer | |
| 8,392,665 B2* | 3/2013 | Moga | G06F 12/0831 711/141 |
| 8,423,736 B2 | 4/2013 | Blake | |
| 8,638,789 B1 | 1/2014 | Pani | |
| 8,935,485 B2* | 1/2015 | Jalal | G06F 12/0815 711/100 |
| 9,058,272 B1* | 6/2015 | O'Bleness | G06F 12/0831 |
| 9,166,936 B1 | 10/2015 | Stovall | |
| 9,507,716 B2 | 11/2016 | Salisbury | |
| 9,575,893 B2* | 2/2017 | Lin | G06F 12/0815 |
| 9,639,469 B2* | 5/2017 | Moll | G06F 12/0831 |
| 9,652,404 B2* | 5/2017 | Pierson | G06F 12/1081 |
| 9,727,466 B2* | 8/2017 | Tune | G06F 12/0833 |
| 9,767,026 B2* | 9/2017 | Niell | G06F 12/0831 |
| 9,817,760 B2* | 11/2017 | Robinson | G06F 12/0815 |
| 9,830,265 B2* | 11/2017 | Rowlands | G06F 12/084 |
| 9,830,294 B2* | 11/2017 | Mathewson | G06F 13/4068 |
| 9,870,209 B2* | 1/2018 | Kelm | G06F 8/52 |
| 2002/0087811 A1 | 7/2002 | Khare et al. | |
| 2002/0147889 A1 | 10/2002 | Kruckemyer et al. | |
| 2002/0184460 A1 | 12/2002 | Tremblay et al. | |
| 2003/0028819 A1 | 2/2003 | Chiu | |
| 2003/0070016 A1* | 4/2003 | Jones | G06F 12/082 710/107 |
| 2003/0105933 A1 | 6/2003 | Keskar et al. | |
| 2003/0115385 A1 | 6/2003 | Adamane et al. | |
| 2003/0131202 A1 | 7/2003 | Khare | |
| 2003/0140200 A1 | 7/2003 | Jamil et al. | |
| 2003/0163649 A1 | 8/2003 | Kapur | |
| 2003/0167367 A1 | 9/2003 | Kaushik | |
| 2004/0003184 A1* | 1/2004 | Safranek | G06F 12/082 711/146 |
| 2004/0117561 A1* | 6/2004 | Quach | G06F 12/082 711/146 |
| 2004/0193809 A1 | 9/2004 | Dieffenderfer et al. | |
| 2005/0005073 A1* | 1/2005 | Pruvost | G06F 1/3203 711/148 |
| 2005/0160430 A1 | 7/2005 | Steely, Jr. et al. | |
| 2005/0201383 A1 | 9/2005 | Bhandari et al. | |
| 2006/0080508 A1* | 4/2006 | Hoover | G06F 12/0822 711/133 |
| 2006/0080512 A1* | 4/2006 | Hoover | G06F 12/0831 711/141 |
| 2006/0136680 A1 | 6/2006 | Borkenhagen et al. | |
| 2006/0224835 A1* | 10/2006 | Blumrich | G06F 12/0831 711/146 |
| 2006/0224836 A1* | 10/2006 | Blumrich | G06F 12/0822 711/146 |
| 2006/0224838 A1* | 10/2006 | Blumrich | G06F 12/0822 711/146 |
| 2006/0224840 A1* | 10/2006 | Blumrich | G06F 12/0822 711/146 |
| 2007/0005899 A1 | 1/2007 | Sistla | |
| 2007/0073879 A1 | 3/2007 | Tsien | |
| 2007/0079044 A1 | 4/2007 | Mandal et al. | |
| 2007/0186054 A1 | 8/2007 | Kruckemyer | |
| 2007/0239941 A1 | 11/2007 | Looi | |
| 2008/0005485 A1* | 1/2008 | Gilbert | G06F 12/0833 711/146 |
| 2008/0005486 A1* | 1/2008 | Mannava | G06F 12/0831 711/146 |
| 2008/0120466 A1 | 5/2008 | Oberlaender | |
| 2008/0209133 A1* | 8/2008 | Ozer | G06F 12/0822 711/146 |
| 2008/0243739 A1 | 10/2008 | Tsien | |
| 2008/0244193 A1 | 10/2008 | Sistla et al. | |
| 2008/0320232 A1 | 12/2008 | Vishin et al. | |
| 2008/0320233 A1 | 12/2008 | Kinter | |
| 2009/0158022 A1* | 6/2009 | Radhakrishnan | G06F 12/0817 713/2 |
| 2009/0300289 A1 | 12/2009 | Kurts | |
| 2011/0179226 A1 | 7/2011 | Takata | |
| 2012/0099475 A1 | 4/2012 | Tokuoka | |
| 2012/0144064 A1 | 6/2012 | Parker | |
| 2012/0198156 A1 | 8/2012 | Moyer | |
| 2013/0042070 A1* | 2/2013 | Jalal | G06F 12/084 711/130 |
| 2013/0042078 A1* | 2/2013 | Jalal | G06F 12/0815 711/146 |
| 2013/0051391 A1 | 2/2013 | Jayasimha | |
| 2014/0032853 A1 | 1/2014 | Lih | |
| 2014/0052905 A1 | 2/2014 | Lih et al. | |
| 2014/0082297 A1 | 3/2014 | Solihin | |
| 2014/0095801 A1* | 4/2014 | Bodas | G06F 12/0891 711/135 |
| 2014/0095806 A1* | 4/2014 | Fajardo | G06F 12/0831 711/146 |
| 2014/0095808 A1* | 4/2014 | Moll | G06F 12/0831 711/146 |
| 2014/0181394 A1 | 6/2014 | Hum et al. | |
| 2014/0189239 A1 | 7/2014 | Hum | |
| 2014/0223104 A1 | 8/2014 | Solihin | |
| 2014/0281180 A1* | 9/2014 | Tune | G06F 12/0817 711/104 |
| 2014/0317357 A1 | 10/2014 | Kaplan et al. | |
| 2014/0372696 A1* | 12/2014 | Tune | G06F 12/0846 711/114 |
| 2015/0074357 A1* | 3/2015 | McDonald | G06F 12/0831 711/146 |
| 2015/0095544 A1 | 4/2015 | Debendra | |
| 2015/0103822 A1 | 4/2015 | Gianchandani | |
| 2015/0127907 A1 | 5/2015 | Fahim et al. | |
| 2015/0286577 A1 | 10/2015 | Solihin | |
| 2015/0324288 A1 | 11/2015 | Rowlands | |
| 2016/0041936 A1 | 2/2016 | Lee et al. | |
| 2016/0055085 A1* | 2/2016 | Salisbury | G06F 12/0831 711/146 |
| 2016/0062889 A1* | 3/2016 | Salisbury | G06F 12/0831 711/146 |
| 2016/0062890 A1* | 3/2016 | Salisbury | G06F 12/0815 711/146 |
| 2016/0062893 A1* | 3/2016 | Tune | G06F 12/0833 711/135 |
| 2016/0117249 A1* | 4/2016 | Lin | G06F 12/0815 711/119 |
| 2016/0147661 A1 | 5/2016 | Ambroladze | |
| 2016/0147662 A1 | 5/2016 | Drapala | |
| 2016/0188471 A1* | 6/2016 | Forrest | G06F 12/0828 711/119 |
| 2016/0210231 A1* | 7/2016 | Huang | G06F 12/0811 |
| 2016/0216912 A1 | 7/2016 | Muralimanohar et al. | |
| 2016/0283375 A1 | 9/2016 | Das Sharma | |
| 2017/0024320 A1 | 1/2017 | Forrest et al. | |
| 2017/0091101 A1* | 3/2017 | Lin | G06F 12/0831 |
| 2017/0168939 A1* | 6/2017 | Jalal | G06F 12/0815 |
| 2017/0185515 A1* | 6/2017 | Fahim | G06F 12/0815 |

OTHER PUBLICATIONS

Subspace snooping: filtering snoops with operating system support; Kim et al; Proceedings of the 19th international conference on

(56) References Cited

OTHER PUBLICATIONS

Parallel architectures and compilation techniques; Sep. 11-15, 2010; pp. 111-122 (12 pages) (Year: 2010).*
A. Moshovos, G. Memik, B. Falsafi and A. Choudhary, "JETTY: filtering snoops for reduced energy consumption in SMP servers," Proceedings HPCA Seventh International Symposium on High-Performance Computer Architecture, Monterrey, 2001, pp. 85-96.

* cited by examiner

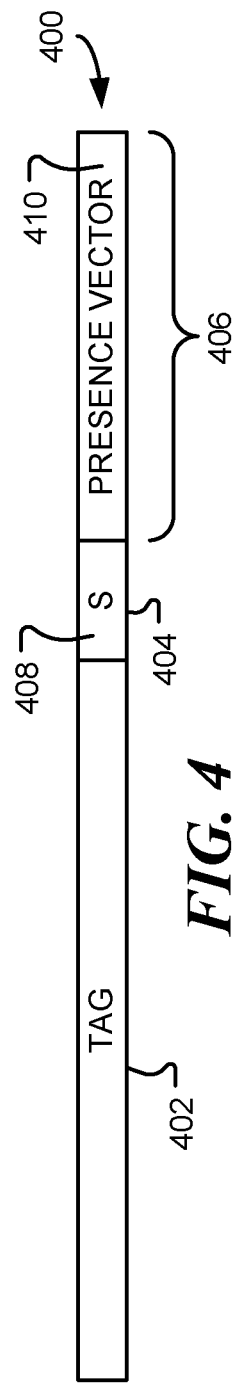
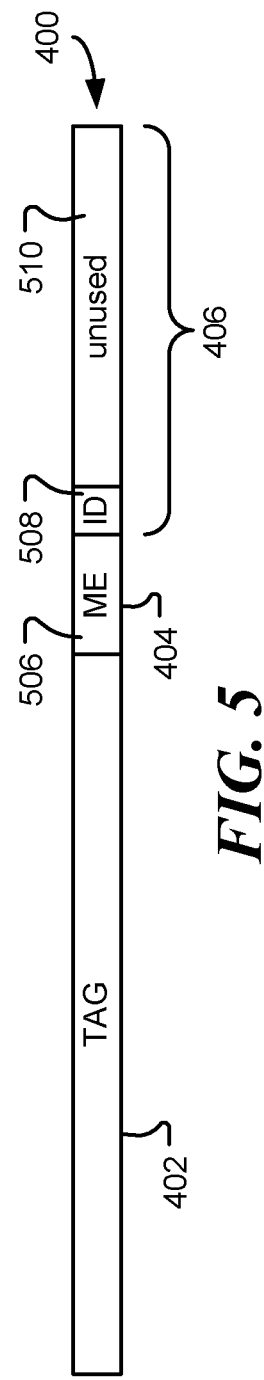
FIG. 4
FIG. 5

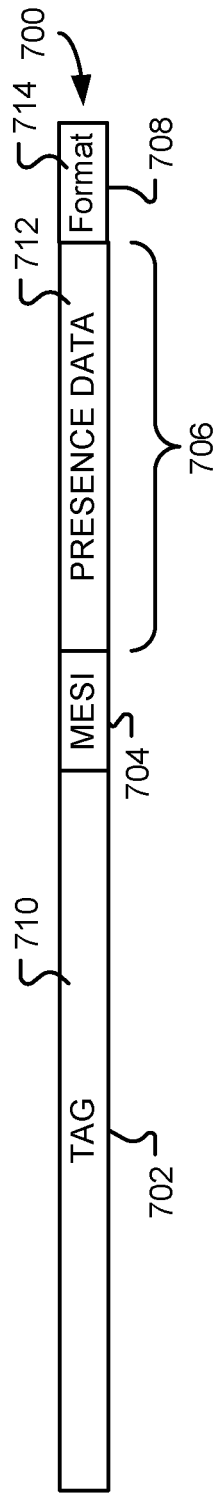
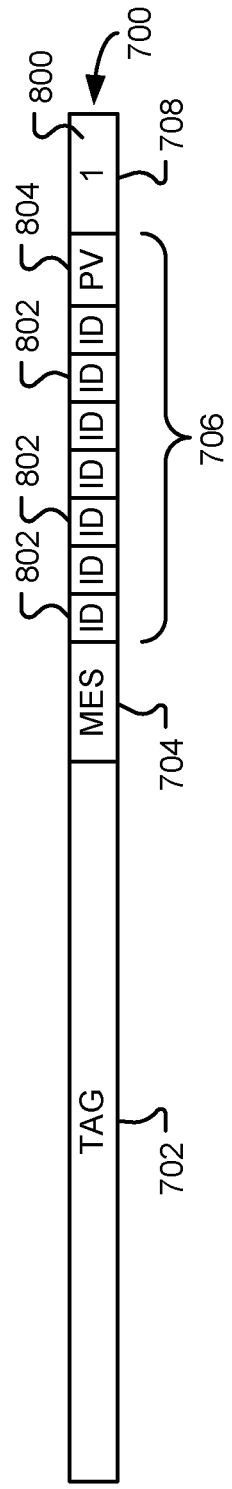

PROGRESSIVE FINE TO COARSE GRAIN SNOOP FILTER

BACKGROUND

Data processing systems, such as a System-on-a-Chip (SoC) may contain multiple processor cores, multiple data caches and shared data resources. In a shared memory system for example, each of the processor cores may read and write to a single shared address space. Cache coherency is an issue in any system that contains one or more caches and more than one device sharing data in a single cached area. There are two potential problems with system that contains caches. Firstly, memory may be updated (by another device) after a cached device has taken a copy. At this point, the data within the cache is out-of-date or invalid and no longer contains the most up-to-date data. Secondly, systems that contain write-back caches must deal with the case where the device writes to the local cached copy at which point the memory no longer contains the most up-to-date data. A second device reading memory will see out-of-date (stale) data.

Snoop filters, which monitor data transactions, may be used to ensure cache coherency.

Cache line based snoop filters in general are 'fine grain' (maintaining one bit for each source in a presence vector) or 'coarse grain' (each bit tracks more than one or many sources). Fine grain snoop filters require more storage and can be expensive as a system grows, while coarse grain snoop filters can lead to an increased amount of snooping. Designs either adopt fine grain or coarse grain based on the system need.

With coarse grain snoop filters there is never a directed snoop to exactly one source as the presence bit always indicates more than one source. This can lead to over snooping always for cases where there is a unique owner of a cache line.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

FIG. 4 is a diagrammatic representation of a line of a snoop filter in a coarse grain configuration in accordance with various representative embodiments.

FIG. 5 is a diagrammatic representation of a line of a snoop filter in a fine grain configuration in accordance with various representative embodiments.

FIG. 7 is a diagrammatic representation of a line of a snoop filter in a coarse grain configuration in accordance with various representative embodiments.

FIG. 8 is a diagrammatic representation of a line of a snoop filter in a fine grain configuration in accordance with various representative embodiments.

DETAILED DESCRIPTION

Figure 1:
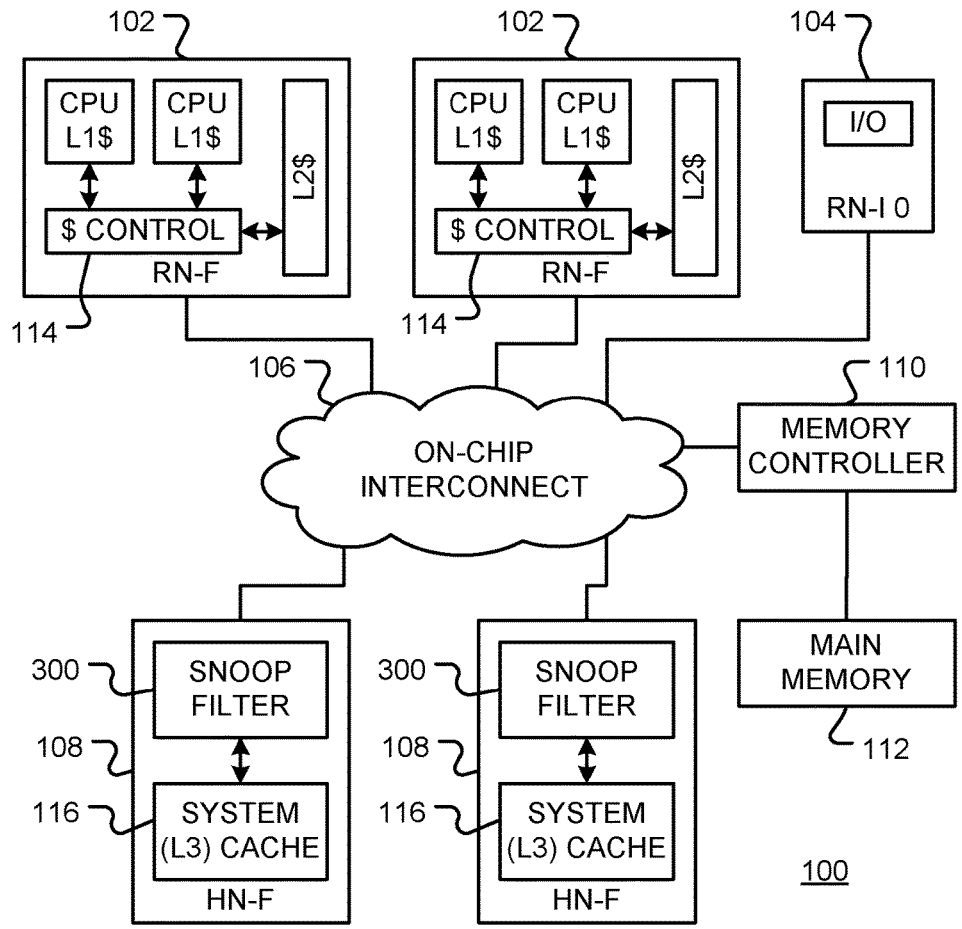
FIG. 1 is a block diagram of a data processing system, in accordance with various representative embodiments.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Data processing systems, such as a System-on-a-Chip (SoC), may contain multiple processing devices, multiple data caches and shared data resources. FIG. 1 is a block diagram of a data processing system 100, in accordance with various representative embodiments. The system 100 may be implemented in a System-on-a-Chip (SoC) integrated circuit, for example. In the simplified example shown, the system 100 is arranged as a network with a number of functional block connected together via an interconnect circuit. As shown, the functional blocks include blocks 102 each comprising cluster of processing cores (CPU's) that share an L2 cache, with each processing core having its own L1 cache. Other devices, such as a graphics post unit (GPU), a digital signal processor (DSP), a field programmable gate array (FPGA) or an application specific integrated circuit (ASIC) device, may be used. In addition, one or more I/O master devices 104 may be included. The blocks 102 and 104 are referred to herein as request nodes (RN's) that may generate requests for data transactions, such as 'load' and 'store', for example. The request nodes are end points for such transactions. The blocks 102 and 104 are coupled via interconnect circuit 106, to data resources that are accessed via home nodes 108 and memory controller 110 that enable the request nodes to access shared main memory 112 or input/output devices. The main memory 112 may be on the chip or external to the chip. Blocks 102 generate data access requests and are referred herein as request nodes (RN's). Devices 108 serve as homes for blocks of data associated with sets of data addresses and are referred to herein as home nodes (HN's). The home nodes respond to data transactions from request nodes and, in responding, may perform data transactions with other functional blocks, such as a memory controller or an I/O device.

Note that many elements of a SoC, such as clocks for example, have been omitted in FIG. 1 for the sake of clarity.

Cache coherency is an issue in any system that contains one or more caches and more than one device sharing data in a single cached area. There are two potential problems with system that contains caches. Firstly, memory may be updated (by another device) after a cached device has taken a copy. At this point, the data within the cache is out-of-date or invalid and no longer contains the most up-to-date data. Secondly, systems that contain write-back caches must deal with the case where the device updates the local cached copy, at which point the memory no longer contains the most up-to-date data. A second device reading memory will see out-of-date (stale) data. Cache coherency may be maintained through use of a snoop filter.

When multiple RN's share a data or memory resource, a coherence protocol may be used, and nodes may be referred to as fully coherent (e.g. RN-F and HN-F) or I/O coherent (e.g. RN-I). Other devices may provide connections to another integrated circuit (e.g. RN-C and HN-C). To maintain coherence, each RN includes a cache controller 14 that accepts load and store instructions from the processor cores. The cache controller 114 also issues and receives coherence requests and responses via the interconnect circuit 106 from other nodes.

Home nodes 108 include a system cache 116. Herein, the system cache 116 is referred to as an L3 cache, however caches at other levels may be used. For example, in a system with multiple caches, the cache 116 may be a lowest or last level cache (LLC). To avoid excessive exchange of messages between the cache controllers 114 of the request nodes 102, a home node 108 also includes a snoop filter 300 that monitors data transactions and maintains the status of data stored in the system cache 116 and operates to maintain coherency of data in the various caches of the system. A home node generally provides an interface to a data resource such as a memory or I/O device. A home node acts as a point of coherence in that it issues coherence responses and receives coherence requests via the interconnect circuit 106 from other nodes. A home node is an intermediate node: it responds to data transaction requests from a request node, and can issue data transaction requests to other devices such as a memory controller. Thus, a home node may act as an intermediary node between a request node and a memory, and may include a cache for temporary storage of data. The snoop filter of a home node functions as a cache controller and a point of coherence. Since memory accesses, for a given set of memory addresses in shared data resource, pass through the same home node, the home node can monitor or 'snoop' on transactions and determine if requested data should be retrieved from a main memory, from a cache in the home node, or from a local cache of one of the request nodes.

In alternative embodiments, one or more snoop filters may be utilized at other locations in a system. For example, a snoop filter may be located in interconnect 106.

Together, snoop filters 300 and cache controllers 114 monitor data transactions and exchange messages to ensure cache coherency. In order to maintain coherency of data in the various local caches, the coherency state of each cache line or block is tracked. For example, data in a local cache, such as cache 114, is said to be in a 'dirty' state if it the most up-to-date but does not match the data in the memory or lowest level cache. Otherwise, the data is said to be 'clean'. A cache coherence protocol may employ a MOESI cache coherence model, in which the cache data may be in one of a number of coherency states. The coherency states are: Modified (M), Owned (O), Exclusive (E), Shared (S) and Invalid (I).

Modified data, also called 'UniqueDirty' (UD) data, is not shared by other caches. Modified data in a local cache has been updated by a device, but has not been written back to memory, so it is 'dirty'. Modified data is exclusive and owned. The local cache has the only valid copy of the data.

Owned data, also called 'SharedDirty' (SD) data, is shared by other caches. It has not been written back to memory so it is 'dirty'.

Exclusive data, also called 'UniqueClean' (UC) data, is not shared and matches the corresponding data in the memory.

Shared data, also called 'SharedClean' (SC) data, is shared and matches the corresponding data in the memory. Shared data is not exclusive, not dirty, and not owned.

Invalid data is data that has be updated in the memory and/or in another cache, so is out-of-date. Valid data is the most up-to-date data. It may be read but it may only be written if it also exclusive.

Alternatively, a cache coherence protocol may employ a MESI cache coherence model. This is similar to the MOESI model except that data cannot be in the 'Owned' or 'SharedDirty' state.

Figure 2:
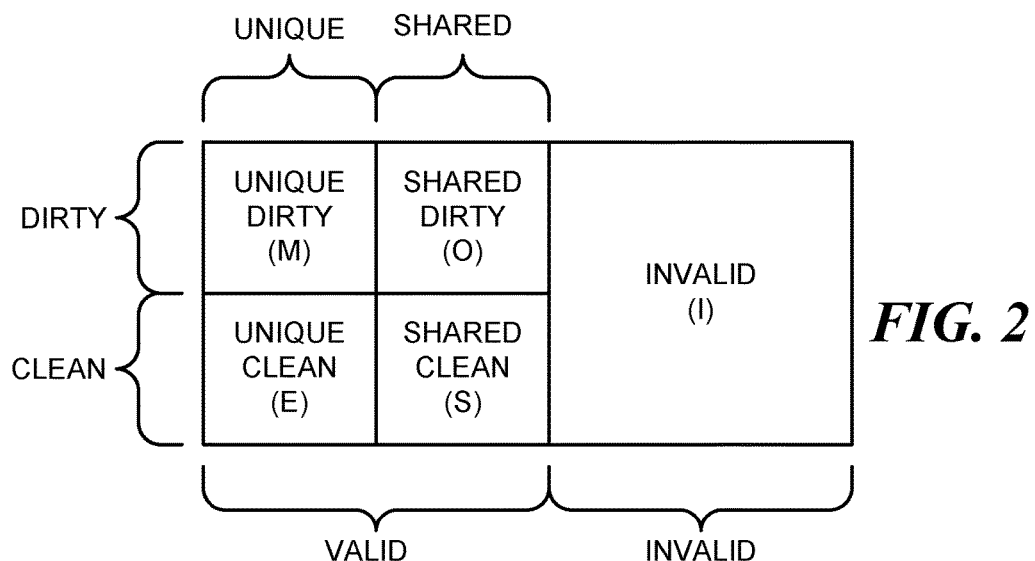
FIG. 2 illustrates coherency states of a cache coherence model, in accordance with various representative embodiments.

FIG. 2 illustrates the various coherency states under a MOESI cache coherence model. Valid data stored in a local cache may be clean or dirty, unique or shared, giving four possible valid coherency states. In a MESI model the 'Owned' state is omitted and shared data is maintained as clean data.

Figure 3:
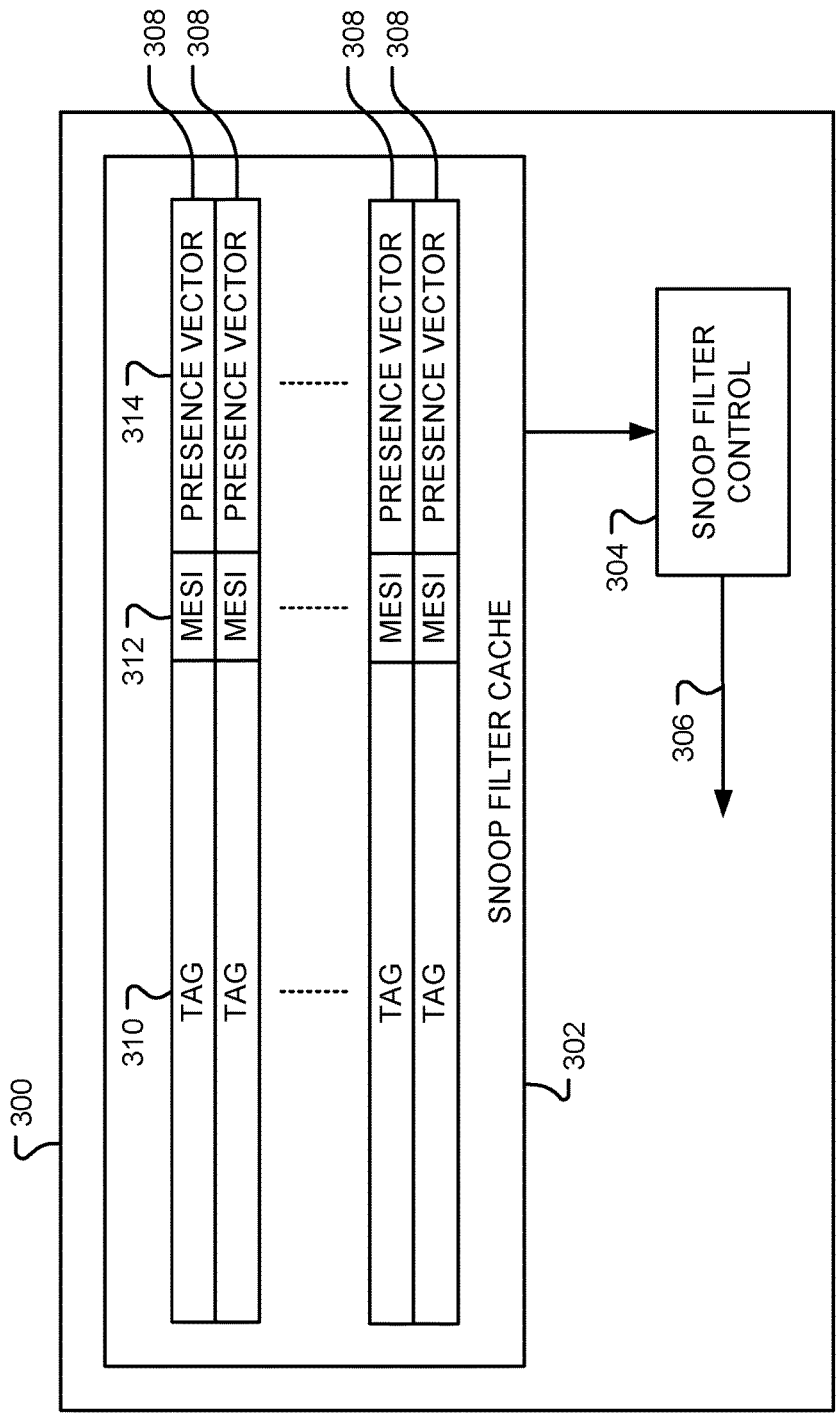
FIG. 3 is a block diagram of a snoop filter of a data cache coherent data processing system.

FIG. 3 is a block diagram of a snoop filter 300 that utilizes a MESI cache coherence model. The snoop filter 300 includes a snoop filter cache 302 and snoop filter control logic 304 that generates snoop signals at output 306. The snoop signals at output 306 may be directed to a particular node, to a subset of the nodes (multicast), or to all of the nodes (broadcast) to communicate with cache controllers at other nodes. A snoop signal may be a request for data associated with a particular address. Such a snoop signal is referred to simply as a 'snoop'. The snoop filter cache 302 contains a number of records 308 associated with cached data in the system. Each record 308 comprises tag field 310, the contents of which identifies the associated data, a cache coherence status field 312 the contents of which indicate the MESI coherency state of the data and a presence vector stored in presence field 314. For a fine grain snoop filter, each bit in the presence vector corresponds to a single node. A bit is set in the presence vector if a correspond node has a copy of data associated with the tag in field 310 in its local cache. This enables the snoop controller to avoid sending snoop messages to nodes that don't have a copy of the data. Thus, snoop traffic is reduced. For a coarse grain snoop filter, each bit in the presence vector corresponds to a prescribed subset of two or more nodes. A bit is set if one or more the corresponding subset of nodes has a copy of the data in its local cache. For a given number of nodes, a coarse grain filter requires less storage but may result in more snoop messages than necessary. However, since no snoop messages are sent to a subset of nodes if none of them has a copy of the requested data, the number of snoop messages is still reduced compared to a system with no snoop filter.

It accordance with one aspect of the present disclosure, it is recognized that when data is in a 'Unique' state, whether 'Modified' or 'Exclusive', only a single node can have a valid copy of the data. For a coarse grain snoop filter this will result in sending unnecessary snoop messages to node in the same subset as the node having the valid copy of the data associated with the tag.

In accordance with various embodiments, the data in presence field 314 may be formatted in two or more ways, as indicated by format data.

In accordance with various embodiments, the format data comprises the cache coherence status stored in field 312, so that the data stored in presence field 314 is interpreted dependent upon the state of the cached data. This is illustrated in FIG. 4 and FIG. 5.

FIG. 4 is a diagrammatic representation of a line 400 of a snoop filter in accordance with various embodiments. The line 400 corresponds to data that is stored in a 'Shared' state at multiple nodes of the system, as indicated by the data 408 in coherence state field 404. In this case, presence data 410 in presence field 406 is interrupted as a presence vector in the usual way for a coarse grain snoop filter, with each bit or binary digit indicting if a corresponding subset of nodes has copies of data associated the tag 402. If data associated with the tag stored in field 402 is requested, snoop messages may be sent to all groups for which the corresponding bit in the presence data 410 is set.

FIG. 5 is a further diagrammatic representation of a line 400 of a snoop filter in accordance with various embodiments. The line 400 corresponds to data that is stored in a 'Modified' or 'Exclusive' state at a single node of the system, as indicated by the data 506 in coherence state field 404. In this case, at least a portion 508 of the data in presence field 406 is interrupted as indicating the particular node having a copy of the data in its local cache. A single snoop message can be sent to the identified node. In a system where the number of nodes is greater than the number of bits in the presence field 406, this approach avoids sending unnecessary or redundant snoop messages.

Figure 6:
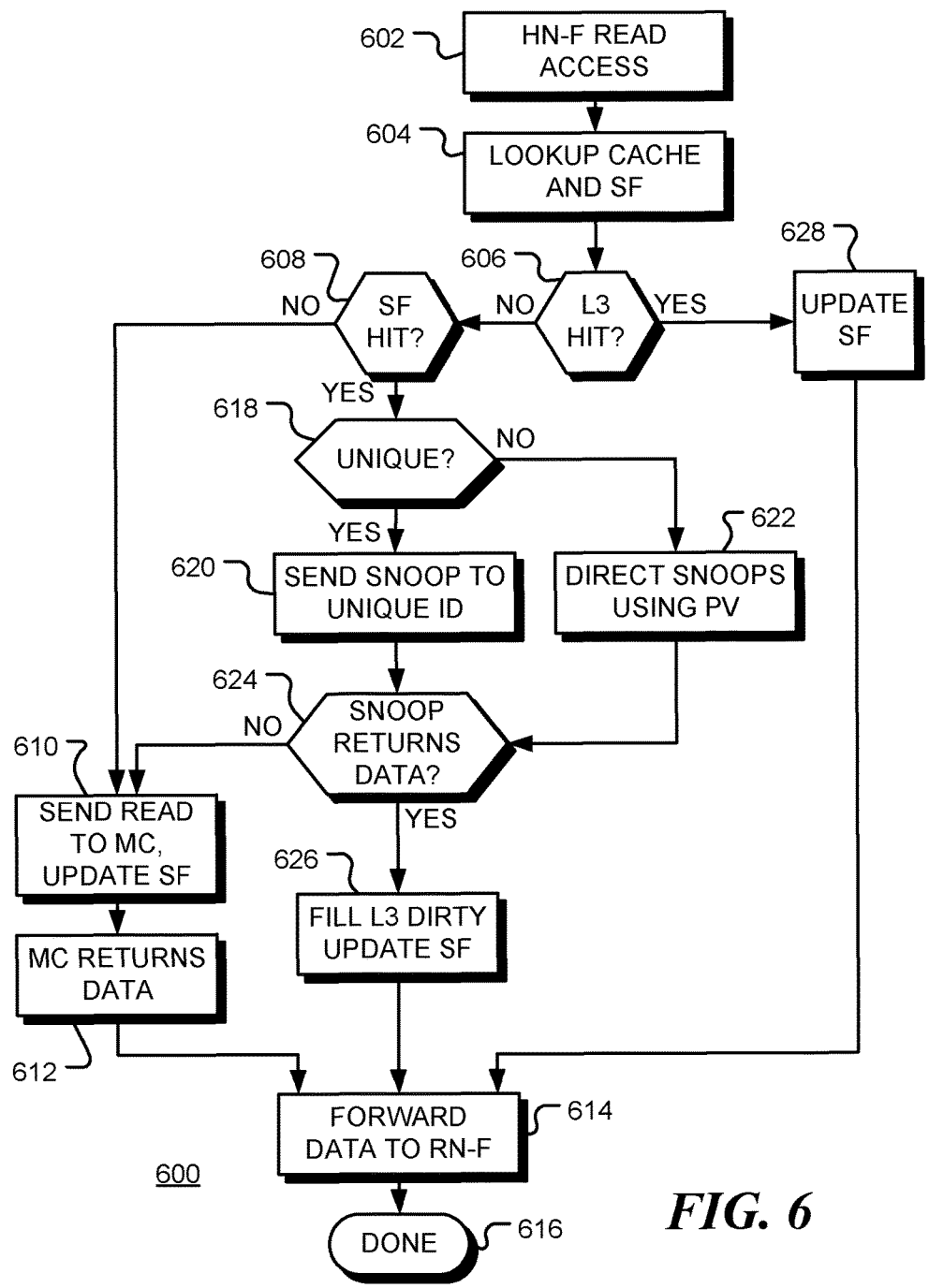
FIG. 6 is a flow chart of a method of operation of a snoop filter of a data processing system, in accordance with various representative embodiments.

FIG. 6 is a flow chart 600 of a method of operation of a snoop filter control logic of a snoop filter of a fully-coherent home node (HN-F) of a data processing system, in accordance with various embodiments. The process begins at block 602 when a request, is sent from an RN-F to the HN-F, for read access to data at an address in system memory. The address is looked-up in the system cache of the HN-F and in the snoop filter (SF) at block 604. If the address is not found in the cache (a cache 'miss'), as indicated by the negative branch from decision block 606, flow continues to decision block 608 to determine, from the snoop filter, if any other caches contain the requested data. If the address is not found in the snoop filter (a snoop filter 'miss'), as depicted by the negative branch from decision block 608, a signal to read the data from memory is sent to a memory controller at block 610, and the snoop filter is updated. The data is received from the memory controller at block 612 and forwarded to the requesting RN-F at block 614. This completes the response as indicated by block 616.

If the address is found in the snoop filter (a snoop filter 'hit'), as indicated by the positive branch from decision block 608, the data is stored in a RN-F cache. If the data is stored in a 'Unique' state, as depicted by the positive branch from decision block 618, the data in presence field 406 is interpreted as a unique identifier of a node, as depicted in FIG. 5 for example, and a snoop is sent at block 620 to the identified RN-F. If the cached data is not stored in a 'Unique' state, as depicted by the negative branch from decision block 618, the data in presence field 406 is interpreted as a coarse grain presence vector, as depicted in FIG. 4 for example, and snoop messages are directed to all subsets of nodes that share the data at block 622. If the response to the snoop fails to return the requested data, as depicted by the negative branch from decision block 624, flow continues to block 610 to retrieve the data from the memory using the memory controller. If, in response to the snoop, the RN-F provides the data, as indicated by the positive branch from decision block 624, the data is stored in the (L3) system cache at block 626 and the coherency state of the cache data is marked in the snoop filter as 'dirty'. By updating the cache at block 626, the data in the local caches of the request node is guaranteed to be clean, thus, there is no requirement to identify the owner of shared dirty data. Flow then continues to block 614. Any subsequent read request will result in a hit in the system cache and so will not generate any snoop. The data will be provided from the system cache.

If the address is found in the cache (a cache 'hit'), as indicated by the positive branch from decision block 608, the data is already stored in the system cache of the HN-F node. The snoop filter (SF) is updated at block 628 to indicate that the requesting RN-F will have a copy of the data and the data is forwarded to the RN-F node at block 614.

When the snoop filter is updated, the data in presence field 406 is updated dependent upon the new coherency state of the data. In particular, the format and interpretation of the field is changed when the coherency state changes from 'Shared' to 'Unique' or from 'Unique' to 'Shared'.

When the coherency state is 'Invalid', the presence field 406 is not used.

In one example, a snoop filter has presence field 406 of length 64 bits. If the system has 256 nodes, the field is too small to storage a fine grain presence vector, so each bit in presence vector may be associated with four nodes. When data is 'Unique', a coarse grain filter would result in three unnecessary snoop messages. However, using a technique of the present disclosure, presence field 406 stores the unique identifier of the single node that has a copy of the data in its local cache. Thus, only a single snoop message is sent. In this example, the unique identifier may be an 8-bit number assigned to a node.

In accordance with a further embodiment of the disclosure, it is recognized the presence field 406 may be used to stored more than one node identifier.

FIG. 7 is a diagrammatic representation of a line 700 of a snoop filter in accordance with various embodiments. The line 700 includes tag field 702, coherency state field 704, presence field 706 and additional format field 708. The format field 708 contains an additional 1-bit format flag that is used to indicate how presence data 712 stored in presence field 706 is to be interpreted.

When the format flag 714 in format field 708 is set to a first value, zero say, the presence data 712 stored in presence field 706 is interpreted as a coarse grain presence vector, with each bit associated with a subset of nodes and indicating if any node in the subset has a copy of data associated with the tag 710 stored in field 702.

When the format flag in format field 708 is set to a second value, one say, the presence field 706 is configured to save a number of unique node identifiers together with a shortened presence vector as depicted in FIG. 8, for example. FIG. 8 is a diagrammatic representation of a line 700 of a snoop filter. The data 800 in format field 800 is set to indicate that the presence field 706 is configured to save a number of unique node identifiers 802 together with a shortened presence vector (PV) 804. The shortened presence vector 804 indicates which of the nodes identified in fields 802 have copies of data associated with the tag in their local cache. For example, if the presence field 706 has 64 bits, and the system has 256 nodes, presence field 706 may be configured to store seven 8-bit node identifiers together with a 7-bit presence vector. In this manner, if data is unique or shared among seven or fewer nodes, the nodes can be uniquely identified and no redundant snoop messages are sent. Conversely, if the data is shared among more than seven nodes, presence field 706 is formatted as a conventional coarse grain presence vector.

Figure 9:
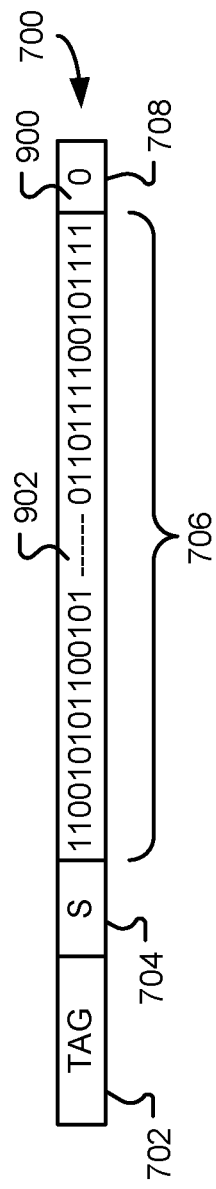
FIG. 9 is a diagrammatic representation of a line of a snoop filter in a coarse grain configuration in accordance with various representative embodiments.

FIG. 9 shows an example line 700 of a snoop filter configured in a first format, as indicated by format flag 900 stored in format field 708. Coherence state field 704 indicates that data is shared among a number of nodes. Presence field 706 is configured as a coarse grain presence vector and stores presence vector 902, where the 1's in presence vector 902 indicate subsets of node for which at least one node of the subset has a copy of the data.

Figure 10:
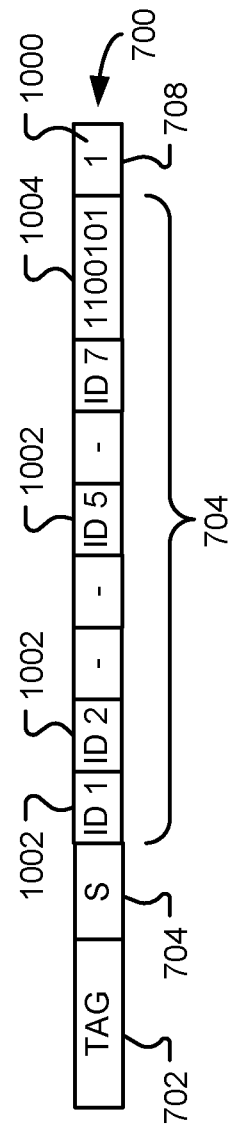
FIG. 10 is a diagrammatic representation of a line of a snoop filter in a fine grain configuration in accordance with various representative embodiments.

FIG. 10 shows an example line 700 of a snoop filter configured in a second format, as indicated by format data 1000 stored in format field 708. Data stored in coherence state field 704 indicates that data is shared among a number of nodes. The example shown is for a system having up to 256 nodes. The presence field 704 consists of 64 bits configured as seven 8-bit identifiers 1002, a 7-bit shortened presence vector 1004 and one unused bit (not shown). In this example, only four nodes have copies of data associated with tag value stored in tag field 702. The 'ones' in shortened presence vector 1004 indicate that nodes with identifiers 1, 2, 5 and 7 have copies of the data, while the corresponding identifiers in fields 1002 indicate the unique nodes having copies of the data. As a result, in this example, only four snoop messages are sent. In a conventional coarse grain snoop filter, with nodes grouped in subsets of four, as many as 16 snoop messages would be sent. Thus, snoop traffic is significantly reduced by the disclosed snoop filter.

Figure 11:
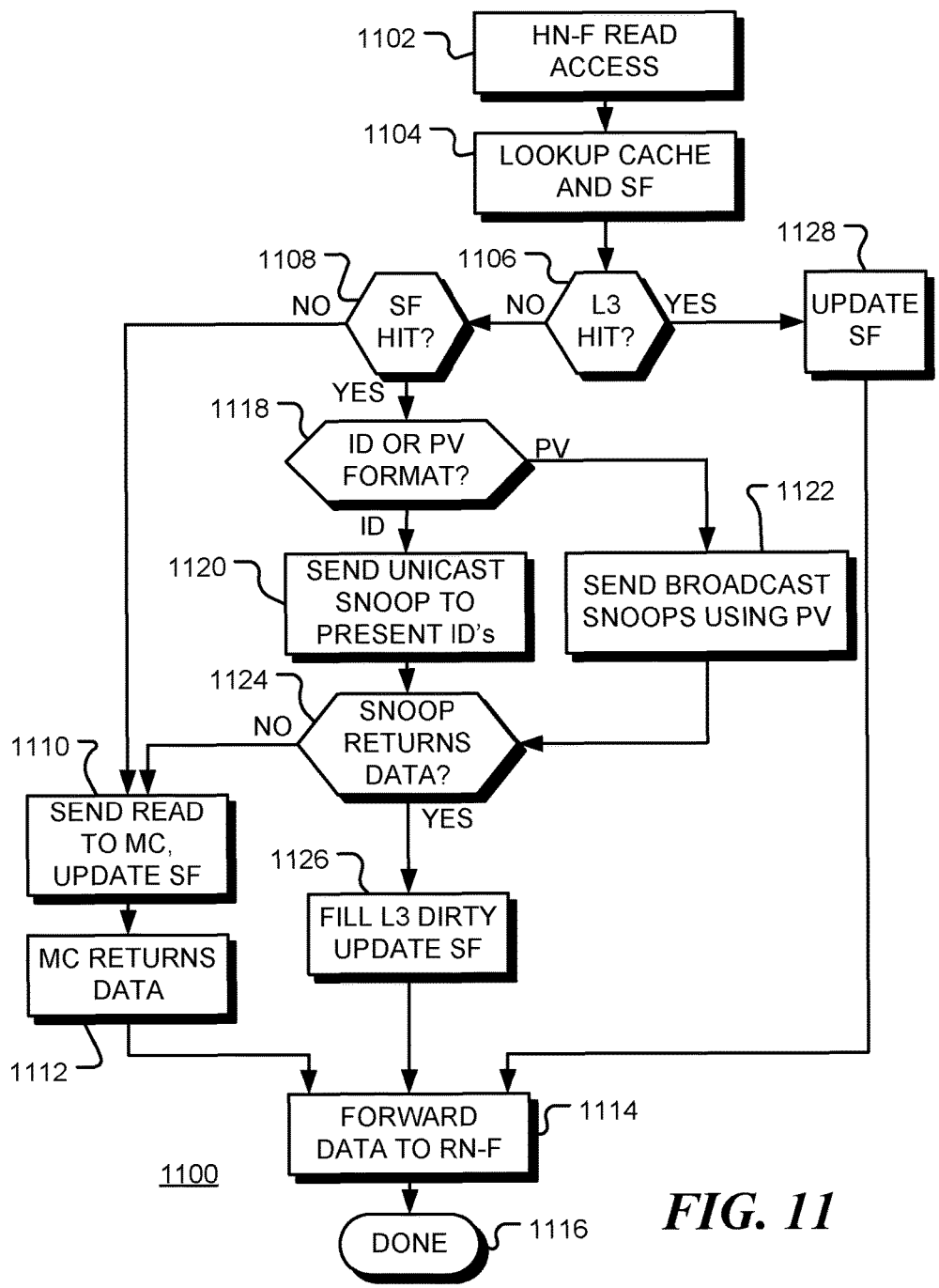
FIG. 11 is a flow chart of a method of operation of a snoop filter of a data processing system, in accordance with various representative embodiments.

FIG. 11 is a flow chart 1100 of a method of operation of a snoop filter control logic of a snoop filter of a fully-coherent home node (HN-F) of a data processing system, in accordance with various embodiments. The process begins at block 1102 when a request, is sent from an RN-F to the HN-F, for read access to data at an address in system memory. The address is looked-up in the system cache of the HN-F and in the snoop filter (SF) at block 1104. If the address is not found in the cache (a cache 'miss'), as indicated by the negative branch from decision block 1106, flow continues to decision block 1108 to determine, from the snoop filter, if any other caches contain the requested data. If the address is not found in the snoop filter (a snoop filter 'miss'), as depicted by the negative branch from decision block 1108, a signal to read the data from memory is sent to a memory controller at block 1110, and the snoop filter is updated. The data is received from the memory controller at block 1112 and forwarded to the requesting RN-F at block 1114. This completes the response as indicated by block 1116.

If the address is found in the snoop filter (a snoop filter 'hit'), as indicated by the positive branch from decision block 1108, the data is stored in a RN-F cache. If the snoop filter line is configured in a first format, as depicted by the 'PV' branch from decision block 1118, the presence field 314 is interpreted as a coarse grain presence vector and broadcast snoop messages are directed to all subsets of nodes that share the data at block 1122. If the snoop filter line is configured in a second format, as depicted by the 'ID' branch from decision block 1118, the presence field 314 is interpreted as indicating one or more unique node identifiers, as discussed above. Unicast snoops are sent, at block 1120 to all of the identified RN-F's. If the response to the snoop fails to return the requested data, as depicted by the negative branch from decision block 1124, flow continues to block 1110 to retrieve the data from the memory using the memory controller. If, in response to a snoop, an RN-F provides the data, as indicated by the positive branch from decision block 1124, the data is stored in the (L3) system cache at block 1126 and the coherency state of the cache data is marked in the snoop filter as 'dirty'. By updating the cache at block 1124, the data in the local caches of the request node is guaranteed to be clean, thus, there is no requirement to identify the owner of shared dirty data. Flow then continues to block 1114. Any subsequent read request will result in a hit in the system cache and so will not generate any snoop. The data will be provided from the system cache.

If the address is found in the cache (a cache 'hit'), as indicated by the positive branch from decision block 1106, the data is already stored in the system cache of the HN-F node. The snoop filter (SF) is updated at block 1128 to indicate that the requesting RN-F will have a copy of the data and the data is forwarded to the RN-F node at block 1114.

When the snoop filter is updated, the presence field 314 is updated dependent upon the new state of the system. In particular, the format and interpretation of the field is changed when the number of nodes sharing a copy of the data exceeds the number of identifiers that can be stored in the presence field 314.

Table 1 provides some example of how presence data may be organized for different number of nodes and different size presence fields. Other values may be used without departing from the present disclosure.

TABLE 1

| # Nodes | Presence Field Size (bits) | Subset size (# nodes) | ID size (bits) | # ID's stored, N | # Presence bits, N | # bits used |
|---|---|---|---|---|---|---|
| 256 | 64 | 4 | 8 | 7 | 7 | 8 × 7 + 7 = 63 |
| 128 | 64 | 2 | 7 | 8 | 8 | 7 × 8 + 8 = 64 |
| 256 | 32 | 8 | 8 | 3 | 3 | 8 × 3 + 3 = 27 |
| 128 | 32 | 4 | 7 | 4 | 4 | 7 × 4 + 7 = 32 |
| 64 | 32 | 2 | 6 | 4 | 4 | 6 × 4 + 4 = 28 |

It will be apparent to those of ordinary skill in the art that the information in a line of a snoop filter may be organized in a variety of ways. For example, the order of the fields may be varied and the order of bits within the fields may be varied with departing from the present disclosure. Further, presence bits may be grouped with associated identifiers rather than grouped together.

As used herein, the term processor, controller or the like may encompass a processor, controller, microcontroller unit (MCU), microprocessor, and other suitable control elements. It will be appreciated that embodiments of the invention described herein may be comprised of one or more conventional processors and unique stored program instructions that control the one or more processors to implement, in conjunction with certain non-processor circuits, some, most, or all of the functions described herein. The non-processor circuits may include, but are not limited to, a receiver, a transmitter, a radio, signal drivers, clock circuits, power source circuits, and user input devices. As such, these functions may be interpreted as a method to perform functions in accordance with certain embodiments consistent with the present invention. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Those skilled in the art will recognize that the present invention has been described in terms of exemplary embodiments based upon use of hardware component such as special purpose hardware, custom logic and/or dedicated processors. However, the invention should not be so limited, since general purpose computers, microprocessor based computers, micro-controllers, optical computers, analog computers, dedicated processors and/or dedicated hard wired logic may be used to construct alternative equivalent embodiments of the present invention.

Further, the hardware components described above may be defined by instructions of a Hardware Description Language (HDL). Such instructions may be stored on a non-transitory machine-readable storage medium or transmitted from one computer to another over a computer network. The HDL instructions may be utilized in the design and manufacture of the defined hardware components of systems containing the hardware components and additional components.

Moreover, those skilled in the art will appreciate that a program flow and associated data used to implement the embodiments described above can be implemented using various forms of storage such as Read Only Memory (ROM), Random Access Memory (RAM), Electrically Erasable Programmable Read Only Memory (EEPROM); non-volatile memory (NVM); mass storage such as storage class memory, a hard disc drive, floppy disc drive, optical disc drive; optical storage elements, magnetic storage elements, magneto-optical storage elements, flash memory, core memory and/or other equivalent storage technologies without departing from the present invention. Such alternative storage devices should be considered equivalents.

Those skilled in the art will appreciate that the processes described above can be implemented in any number of variations without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A method of operation of a snoop filter of a data processing system having a plurality of nodes, where each node has a local cache, where the plurality of nodes are grouped in a plurality of subsets and where each subset consists of one or more nodes, the method comprising:
   receiving a request from a first node of the plurality of nodes to access a data address;
   accessing an entry of the snoop filter, dependent upon the data address, to retrieve format data and presence data, where the format data is indicative of a format of the presence data, where the format of the presence data is changeable between a first format and a second format;
   when the format data indicates the first format for the presence data:
      determining, from the retrieved presence data, one or more unique identifiers of nodes from the retrieved presence data, each of the one or more nodes identified by the one or more unique identifiers having a copy of data associated with the data address in its local cache; and
      sending a snoop message to each of the one or more nodes; and
   when the format data indicates the second format for the presence data:
      identifying, from positions of set bits within the retrieved presence data, one or more subsets of the plurality of subsets;
      sending a snoop message to each node in each subset of the identified one or more subsets, and
      changing the format of the presence data in the entry of the snoop filter from the second format to the first format when a coherency state of data associated with the data address changes from 'Shared' to 'Unique'.

2. The method of claim 1, where the format data comprises a coherency state value, where the first format is indicated when the coherency state value denotes a 'Unique' state, in which a copy of data associated with the data address is stored in a local cache of a single node, where the one or more unique identifiers of nodes consists of a single unique identifier, and where the second format is indicated when the coherency state value denotes a 'Shared' state, in which copies of data associated with the data address are stored in local caches of more than one node.

3. The method of claim 1, where the format data comprises a binary digit denoting the first or second format and where, in the first format, the presence data comprises:
   a plurality, N, of node identifiers associated with N nodes of the plurality of nodes; and
   a plurality, N, of presence bits that indicate which of the N nodes corresponding to the N node identifiers have copies of data associated with the data address in a local cache.

4. The method of claim 1, further comprising updating the format of the presence data associated with the data address dependent upon a coherency state of the data associated with the data address.

5. The method of claim 1, further comprising updating the format of the presence data associated with the data address dependent upon the number of nodes having a copy of data associated with the data address in their local cache.

6. A data processing apparatus comprising:
   a plurality of nodes, each having a local cache in which data associated with a data address may be stored;
   a snoop filter organized as a plurality of lines, each line comprising:
      an address tag field configured to store an address tag associated with the data address;
      a status field configured to store a coherency state of data stored in one or more local caches of the nodes; and
      a presence field configured to store presence data;
   a snoop controller operable to receive data access requests from one or more of the plurality of nodes and further operable to send snoop messages to one or more of the plurality of nodes;
where the format of the presence field in a line of the snoop filter is changeable between a first format, in which the presence data comprises a unique identifier of a node, the unique identifier indicating a node having a copy in its local cache of the data associated with the data address, and a second format, in which the value of a bit in the presence data is indicative of whether the data associated with the data address is stored in at least one local cache of a subset of the plurality of nodes associated with the bit,
where the format of the presence field in a line of the snoop filter is changed from the second format to the first format when the coherency state of the line is changed from 'Shared' to 'Unique', and
where the snoop controller is configured to send snoop messages to one or more nodes indicated by the presence data stored in the presence field of the snoop filter.

7. The data processing apparatus of claim 6, where the presence field is configured in the first format when data associated with the data address is stored only in the local cache of only one node of the plurality of nodes, and is configured in the second format when data associated with the data address is stored in more than one local cache of the plurality of nodes.

8. The data processing apparatus of claim 7, where the snoop controller is configured to select between the first and second format of the presence field dependent upon the coherency state indicated by data stored in the status field.

9. The data processing apparatus of claim 6, where in the first format the presence field is configured to store a plurality of unique identifiers of nodes and a plurality of presence bits indicative of which of the nodes identified by the plurality of unique identifiers has a copy of the data associated with the data address in its local cache.

10. The data processing apparatus of claim 9, where each line of the snoop filter further comprises a format field that stores a format value, and where the snoop controller is configured to select between the first and second format of the presence field dependent upon the format value.

11. The data processing apparatus of claim 6, further comprising:
   one or more home nodes that serve as homes for blocks of data associated with sets of data addresses; and
   an interconnect circuit that couples between the plurality of home nodes and the plurality of nodes.

12. The data processing apparatus of claim 11, where a home node of the one or more home nodes comprises:
   the snoop filter;
   the snoop controller; and
   a cache.

13. The data processing apparatus of claim 11, where the interconnect circuit comprises:
   the snoop filter; and
   the snoop controller.

14. A System-on-a-Chip comprising the data processing apparatus of claim 11.

15. A non-transitory machine-readable storage medium containing instructions of a Hardware Description Language that define the data processing apparatus of claim 6.

* * * * *